US012736466B2

(12) United States Patent
Sano et al.

(10) Patent No.: US 12,736,466 B2
(45) Date of Patent: Sep. 15, 2026

(54) SPECTROSCOPIC MEASUREMENT DEVICE AND ARTICLE INSPECTION DEVICE INCLUDING THE SAME

(71) Applicant: ANRITSU CORPORATION, Kanagawa (JP)

(72) Inventors: Jyunichi Sano, Kanagawa (JP); Eiji Taniguchi, Kanagawa (JP); Kohei Suzuki, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 42 days.

(21) Appl. No.: 19/069,928

(22) Filed: Mar. 4, 2025

(65) Prior Publication Data

US 2025/0283806 A1 Sep. 11, 2025

(30) Foreign Application Priority Data

Mar. 8, 2024 (JP) ................................ 2024-036153

(51) Int. Cl.
*G01N 21/31* (2006.01)

(52) U.S. Cl.
CPC ......... *G01N 21/31* (2013.01); *G01N 2201/08* (2013.01)

(58) Field of Classification Search
CPC ........ G01N 21/31; G01N 21/3563; G01J 3/28
See application file for complete search history.

(56) References Cited

U.S. PATENT DOCUMENTS 5,523,845 A * 6/1996 Honzawa ............... G01N 21/15 385/12
2020/0049627 A1* 2/2020 Franjic .................. G01N 21/65

FOREIGN PATENT DOCUMENTS

WO 2018-135233 A1 7/2018
WO WO-2019115594 A2 * 6/2019 ............. G01J 5/602

* cited by examiner

*Primary Examiner* — Abdullahi Nur
(74) *Attorney, Agent, or Firm* — McDonald Hopkins LLC

(57) ABSTRACT

A spectroscopic measurement device capable of preventing entry of stray light into an optical fiber and preventing a decrease in accuracy of data of a spectrum of light incident on the optical fiber. The spectroscopic measurement device includes a light source unit, and a light detection unit in which transmission light transmitted through the article is incident on an optical fiber and a spectral characteristic of the transmission light passing through the optical fiber is measured by the spectroscope, in which the light detection unit further includes a tubular member between the article and the optical fiber, and an opening on an end of the tubular member on a side facing toward the article is positioned on the article side with respect to an incidence end of the optical fiber and the transmission light passes through the tubular member from the opening and is incident on the optical fiber.

20 Claims, 5 Drawing Sheets

45a

W

W

Transport direction

SPECTROSCOPIC MEASUREMENT DEVICE AND ARTICLE INSPECTION DEVICE INCLUDING THE SAME

TECHNICAL FIELD

The present invention relates to a spectroscopic measurement device and an article inspection device.

BACKGROUND ART

Patent Document 1 discloses a technique of irradiating a target object with light from a light source, receiving the light transmitted through the target object with a detection unit, and detecting data of a spectrum of the light received by the detection unit as measurement data.

RELATED ART DOCUMENT

Patent Document

[Patent Document 1] WO2018/135233

DISCLOSURE OF THE INVENTION

Problem That the Invention is to Solve

Meanwhile, in the technique described in Patent Document 1, although a lens that focuses the light transmitted through the target object is provided, no measure is taken with respect to light other than the light transmitted through the target object entering the detection unit.

Therefore, in the technique described in Patent Document 1, there is a concern that the light other than the light emitted from the light source and transmitted through the target object may be received by the detection unit as stray light, and there is a concern that accuracy of data of the spectrum of the light received by the detection unit may be decreased.

The present invention has been made in view of the above circumstances, and an object of the present invention is to provide a spectroscopic measurement device and an article inspection device capable of preventing entry of stray light into an optical fiber and preventing a decrease in accuracy of data of a spectrum of light incident on the optical fiber.

Means for Solving the Problem

A spectroscopic measurement device according to a first aspect of the present invention includes: a light source unit configured to irradiate an article with light; and a light detection unit including an optical fiber on which transmission light transmitted through the article is incident and a spectroscope configured to measure a spectral characteristic of the transmission light passing through the optical fiber, in which the light detection unit further includes a tubular member on an optical path between the article and the optical fiber, and an opening on an end of the tubular member on a side facing toward the article is positioned on the article side with respect to an incidence end of the optical fiber and the transmission light passes through the tubular member from the opening and is incident on the optical fiber.

With the configuration, in the spectroscopic measurement device according to the first aspect of the present invention, the light detection unit includes the tubular member between the article and the optical fiber, the opening on the end of the tubular member on the side facing toward the article is positioned on the article side with respect to the incidence end of the optical fiber, and the transmission light passes through the tubular member from the opening and is incident on the optical fiber. Therefore, it is possible to block incidence of light other than the transmission light, which is emitted from the light source unit and transmitted through the article, on the incidence end of the optical fiber with the tubular member. Therefore, the spectroscopic measurement device according to the present invention can prevent entry of stray light into the optical fiber and can prevent a device in accuracy of data of a spectrum of the light incident on the optical fiber.

In the spectroscopic measurement device according to a second aspect of the present invention, in the spectroscopic measurement device according to the first aspect, a surface treatment for absorbing light is performed on an inner wall surface of the tubular member.

With the configuration, in the spectroscopic measurement device according to the second aspect of the present invention, since the inner wall surface of the tubular member is subjected to the surface treatment for absorbing light, even in a case where stray light enters the tubular member through the opening of the tubular member from a gap between the article and the tubular member, the inner wall surface can absorb or attenuate the stray light. As a result, it is possible to reduce stray light incident on the incidence end of the optical fiber.

In the spectroscopic measurement device according to a third aspect of the present invention, in the spectroscopic measurement device according to the first aspect, the tubular member includes an opening end at which the opening is formed, and the opening end is sharply formed. In addition, in the spectroscopic measurement device according to a fourth aspect of the present invention, in the spectroscopic measurement device according to the second aspect, the tubular member includes an opening end at which the opening is formed, and the opening end is sharply formed.

With the configuration, in the spectroscopic measurement device according to the third aspect and the fourth aspect of the present invention, since the opening end of the tubular member is sharply formed, it is possible to reduce a case where stray light is reflected on the opening end of the tubular member facing the article to the article side and is further reflected on the article side to an incidence end side of the optical fiber.

In the spectroscopic measurement device according to a fifth aspect of the present invention, in the spectroscopic measurement device according to the first aspect, the light source unit is configured to irradiate the article that is moving with light, and the tubular member has an elliptical shape in which a shape of the opening has a minor axis with a dimension shorter than a diameter of the article in a moving direction of the article. In addition, in the spectroscopic measurement device according to a sixth aspect of the present invention, in the spectroscopic measurement device according to the second aspect, the light source unit is configured to irradiate the article that is moving with light, and the tubular member has an elliptical shape in which a shape of the opening has a minor axis with a dimension shorter than a diameter of the article in a moving direction of the article. In addition, in the spectroscopic measurement device according to a seventh aspect of the present invention, in the spectroscopic measurement device according to the third aspect, the light source unit is configured to irradiate the article that is moving with light, and the tubular member has an elliptical shape in which a shape of the opening has a minor axis with a dimension shorter than a diameter of the article in a moving direction of the article.

In addition, in the spectroscopic measurement device according to an eighth aspect of the present invention, in the spectroscopic measurement device according to the fourth aspect, the light source unit is configured to irradiate the article that is moving with light, and the tubular member has an elliptical shape in which a shape of the opening has a minor axis with a dimension shorter than a diameter of the article in a moving direction of the article.

With the configuration, in the spectroscopic measurement device according to the fifth to eighth aspects of the present invention, since the shape of the opening of the tubular member has an elliptical shape having the minor axis with a dimension shorter than the diameter of the article in the moving direction of the article, a time during which the article that is moving and the opening of the tubular member overlap each other in an axial direction can be increased. Accordingly, it is possible to irradiate the article that is moving with light for a longer time and to improve the accuracy of the data of the spectrum of the light incident on the optical fiber.

In the spectroscopic measurement device according to a ninth aspect of the present invention, in the spectroscopic measurement device according to the first aspect, the tubular member is configured to be replaceable according to a type of the article. In addition, in the spectroscopic measurement device according to a tenth aspect of the present invention, in the spectroscopic measurement device according to the second aspect, the tubular member is configured to be replaceable according to a type of the article. In addition, in the spectroscopic measurement device according to an eleventh aspect of the present invention, in the spectroscopic measurement device according to the third aspect, the tubular member is configured to be replaceable according to a type of the article. In addition, in the spectroscopic measurement device according to a twelfth aspect of the present invention, in the spectroscopic measurement device according to the fifth aspect, the tubular member is configured to be replaceable according to a type of the article.

With the configuration, in the spectroscopic measurement device according to the ninth to twelfth aspects of the present invention, since the tubular member is configured to be replaceable according to the type of the article, in a case where the article to be measured is changed to an article of a different type, a dimension of the opening and a length of the opening in the axial direction can be changed to the tubular member that is optimally formed for the article, for example, according to the shape, the dimension, or the like of the article after the change. As a result, even in a case where the article to be measured is changed, it is possible to prevent the entry of the stray light into the optical fiber.

An article inspection device according to a thirteenth aspect of the present invention includes: the spectroscopic measurement device according to the first aspect; and an inspection unit configured to inspect a quality of the article based on the spectral characteristic measured by the spectroscope. In addition, an article inspection device according to a fourteenth aspect of the present invention includes: the spectroscopic measurement device according to the second aspect; and an inspection unit configured to inspect a quality of the article based on the spectral characteristic measured by the spectroscope. In addition, an article inspection device according to a fifteenth aspect of the present invention includes: the spectroscopic measurement device according to the third aspect; and an inspection unit configured to inspect a quality of the article based on the spectral characteristic measured by the spectroscope. In addition, an article inspection device according to a sixteenth aspect of the present invention includes: the spectroscopic measurement device according to the fifth aspect; and an inspection unit configured to inspect a quality of the article based on the spectral characteristic measured by the spectroscope. In addition, an article inspection device according to a seventeenth aspect of the present invention includes: the spectroscopic measurement device according to the sixth aspect; and an inspection unit configured to inspect a quality of the article based on the spectral characteristic measured by the spectroscope. In addition, an article inspection device according to an eighteenth aspect of the present invention includes: the spectroscopic measurement device according to the ninth aspect; and an inspection unit configured to inspect a quality of the article based on the spectral characteristic measured by the spectroscope.

With the configuration, since the article inspection device according to the thirteenth to eighteenth aspects of the present invention includes the spectroscopic measurement device that can prevent entry of stray light into the optical fiber and can prevent a decrease in the accuracy of the data of the spectrum of the light incident on the optical fiber, it is possible to prevent a decrease in inspection accuracy of the quality of the article using the inspection unit.

The article inspection device according to nineteenth aspect of the present invention, in the article inspection device according to the sixteenth aspect, further includes: a transport unit configured to hold the article on an end surface different from an irradiation-side surface and a transmission-side surface of the article and move the article in a state in which the irradiation-side surface and the transmission-side surface are exposed. In addition, the article inspection device according to a twentieth aspect of the present invention, in the article inspection device according to the seventeenth aspect, further includes: a transport unit configured to hold the article on an end surface different from an irradiation-side surface and a transmission-side surface of the article and move the article in a state in which the irradiation-side surface and the transmission-side surface are exposed.

With the configuration, in the article inspection device according to the nineteenth and twentieth aspects of the present invention, since there is no object that blocks the irradiation-side surface, to which the light from the light source unit is emitted, and the transmission-side surface, through which the transmission light passes, in the article being transported, the inspection can be performed with higher accuracy.

Advantage of the Invention

According to the present invention, it is possible to provide a spectroscopic measurement device and an article inspection device capable of preventing entry of stray light into an optical fiber and preventing a decrease in accuracy of data of a spectrum of light incident on the optical fiber.

BEST MODE FOR CARRYING OUT THE INVENTION

Hereinafter, an article inspection device including a spectroscopic measurement device according to an embodiment of the present invention will be described with reference to the drawings.

In a case where an article to be inspected, which is individually transported by a transport unit through a transport passage, reaches a predetermined inspection position, the article inspection device according to the present embodiment irradiates the article, which is in a certain posture, with light at the predetermined inspection position, and inspects a quality of the article based on a spectral characteristic of transmission light transmitted through the article in association with the irradiation of the light (also referred to as irradiation light).

The article to be inspected is an article having a size relatively close to an area irradiated with light, and includes an article having an outer diameter φ: several mm to several tens mm, which can be individually transported without being packaged, an article having a bite size, and an article or molded product having a predetermined shape and manufactured by existing manufacturing equipment or manufacturing equipment without an inspection function, particularly an article whose shape does not change in a transport process.

Examples of the article include a preparation, such as a tablet, a capsule, a troche, and a drop, a candy, chocolate, and the like. Hereinafter, as the article to be inspected, a tablet W having a circular shape in a plan view and a substantially columnar shape in a side view having a small height (thickness) compared to a diameter will be described as an example. The article to be inspected is not limited to a circular shape in a plan view, and articles having various shapes such as an elliptical shape and a polygonal shape can be applied.

In addition, examples of the transport unit include a transport unit having a configuration in which articles are aligned and individually transported, such as a transport belt, a transport disk, and a transport chute. In the present embodiment, an example in which a transport disk 11 (refer to FIG. 1) is used as the transport unit will be described.

Figure 1:
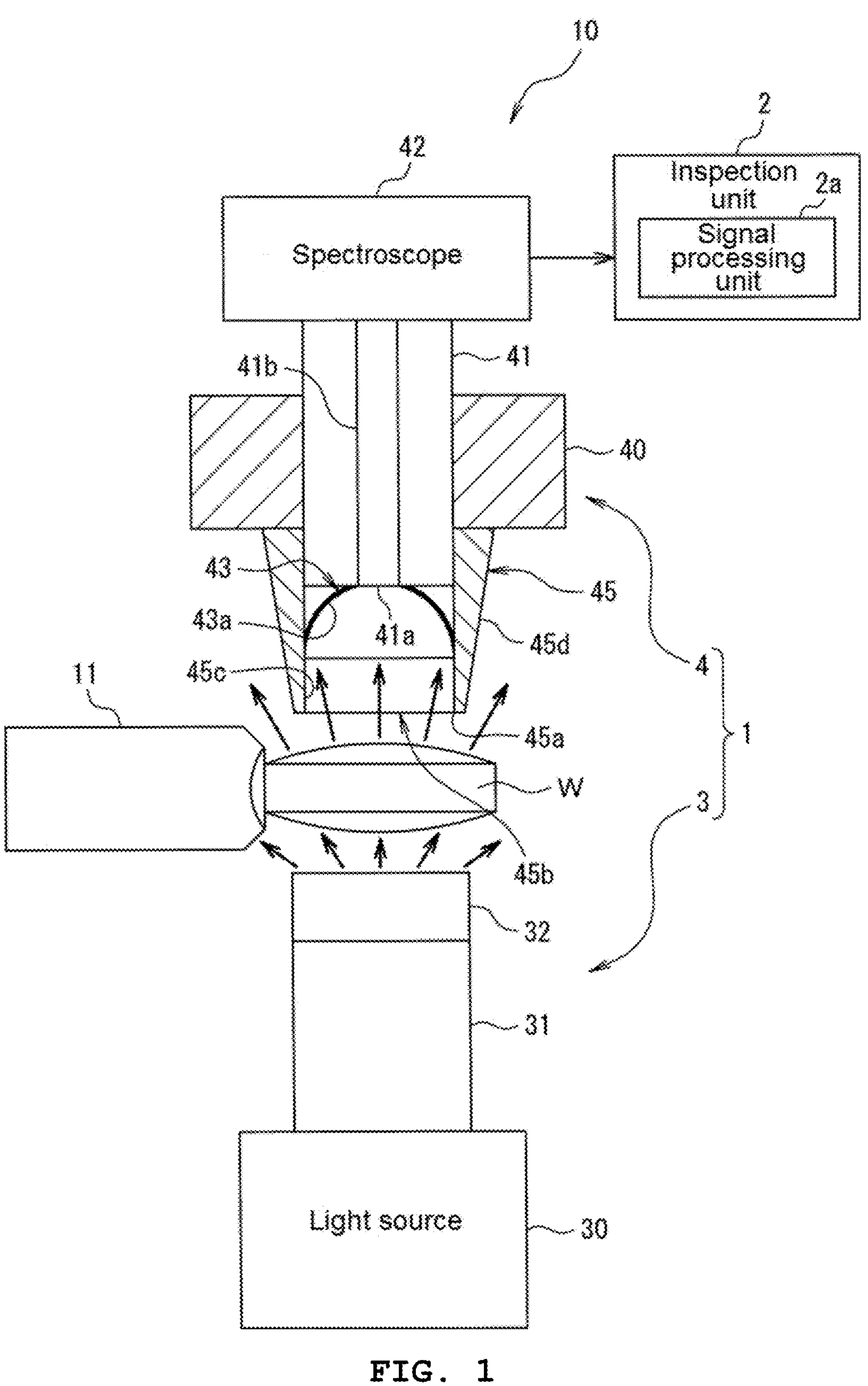
FIG. 1 is a schematic configuration diagram of an article inspection device including a spectroscopic measurement device according to an embodiment of the present invention.

As shown in FIG. 1, the transport disk 11 is a transport unit having a configuration in which the tablet W is sucked to a suction hole on an outer peripheral surface thereof and transported in a circumferential direction while being laterally rotated. In the transport disk 11, the tablet W is transported in a state where an upper surface and a lower surface are horizontally maintained by a side surface being sucked to the suction hole. In FIG. 1, only a part of an outer peripheral side of the transport disk 11 is shown.

An article inspection device 10 according to the present embodiment includes a spectroscopic measurement device 1 and an inspection unit 2.

Spectroscopic Measurement Device

The spectroscopic measurement device 1 includes a light source unit 3 and a light detection unit 4. The spectroscopic measurement device 1 irradiates the tablet W to be measured with broadband light (visible light and near-infrared to terahertz light (terahertz waves)), and measures a spectral characteristic of light transmitted through the tablet W in association with the irradiation of the light.

(Light Source Unit)

The light source unit 3 irradiates the tablet W passing through a predetermined inspection position, that is, the tablet W during transportation (movement) with broadband light. In the present embodiment, the light source unit 3 is disposed on a side opposite to the light detection unit 4 (in the present embodiment, a lower side) with a transport passage of the tablet W interposed therebetween such that the light source unit 3 emits light from one side (in the present embodiment, the lower side) of a pair of circular end surfaces of the tablet W having a substantially columnar shape toward the other side (in the present embodiment, an upper side).

The transport passage of the tablet W is a region through which the tablet W passes during transportation. In addition, the predetermined inspection position is a position at which the light source unit 3 and the light detection unit 4 are disposed in the transport passage of the tablet W.

The light source unit 3 includes a light source 30, a light guide 31, and an optical lens 32.

The light source 30 is configured with a broadband light source represented by, for example, a halogen lamp in order to irradiate the tablet W to be measured with broadband light, and is provided at a predetermined position as a light source unit that is integrally assembled with a case in which lamp holding means and a heat dissipation fin (not shown) are formed, and is connected to a power supply unit (neither of which shown).

The broadband light refers to light including visible light and near-infrared to terahertz light (terahertz waves). It should be noted that a wavelength of light to be irradiated does not need to cover all of the above, and for example, in a wavelength band of 400 to 2500 nm, an object to be measured such as a tablet is likely to be transmitted, and damage due to ultraviolet rays is unlikely to be applied, and thus the wavelength may be limited to the wavelength band or a near-infrared band within the wavelength band. In addition, in a case where an absorption spectrum of a component to be measured is known, only a wavelength range corresponding to the absorption spectrum may be used.

The light guide 31 is configured by bundling a large number of glass optical fibers, and guides the light from the light source 30 to the optical lens 32 that focuses the light.

The optical lens 32 focuses the light from the light guide 31 on the tablet W (in the example of FIG. 1, also referred to as the lower surface of the tablet W and an irradiation-side surface) at the predetermined inspection position.

The light source unit 3 emits broadband light from the light source 30 to the optical lens 32 via the light guide 31, adjusts a magnification of the optical lens 32 (a position of the optical lens 32, positions of the light source 30 and the tablet W) such that the entire lower surface of the tablet W at the predetermined inspection position is covered by the optical lens 32, and irradiates the tablet W passing through the predetermined inspection position with the light from the light source 30.

(Light Detection Unit)

The light detection unit 4 includes an optical fiber 41 and a spectroscope 42. The light detection unit 4 is a unit in which the optical fiber 41 and the spectroscope 42 are supported by a base member 40.

The light detection unit 4 is disposed on a side opposite to the light source unit 3 (in the present embodiment, the upper side) with the transport passage of the tablet W interposed therebetween such that the light detection unit faces an end surface (also referred to as a transmission-side surface) on the other side (in the present embodiment, the upper side) of a pair of circular end surfaces of the tablet W having the substantially columnar shape.

In the optical fiber 41, transmission light transmitted through the tablet W is incident on a core portion 41*b* at the predetermined inspection position. The transmission light transmitted through the tablet W is incident on the optical fiber 41 from an end surface (hereinafter, referred to as an "incidence end") 41*a* of an incidence surface of the optical fiber 41. The transmission light incident on the optical fiber 41 passes through the optical fiber 41 and reaches the spectroscope 42.

The spectroscope 42 performs, for example, spectral separation through a grating using a difference in a diffraction angle depending on the wavelength of light. Specifically, the light entering the spectroscope 42 is emitted to the grating (diffraction grating) and is spectrally separated into wavelength components. Then, the light spectrally separated into the wavelength components is detected by light detection elements arranged in one row for each wavelength component. Then, light intensity for each wavelength component is measured. The grating is an optical element in which a plurality of grooves are engraved on a surface.

As the optical fiber 41, a tapered optical fiber having a shape in which a diameter of an input is large and a diameter of an output is small can be used. As a result, the transmission light can be more efficiently incident on the spectroscope 42.

As described above, the light detection unit 4 measures the spectral characteristic of the transmitted light that is emitted from the light source unit 3 and transmitted through the tablet W using the spectroscope 42, the transmission light being incident on the optical fiber 41 and passing through the optical fiber 41.

In the present embodiment, the light detection unit 4 is provided with a reflection cover 43. The reflection cover 43 is provided to surround the incidence end 41*a* of the optical fiber 41, and has a hemispherical shape that spreads from the incidence end 41*a* of the optical fiber 41 toward the upper surface of the tablet W. The shape of the inner surface of the reflection cover 43 is not limited to the hemispherical shape and may be, for example, a frustum shape.

The reflection cover 43 has a reflection surface 43*a* that reflects the transmission light transmitted through the tablet W to the upper surface of the tablet W on the inner surface of the hemisphere. In addition, an incidence end 41*a* of the optical fiber 41 is disposed near the apex of the hemisphere.

The transmission light that is emitted from the light source unit 3 and transmitted through the tablet W is repeatedly reflected between the reflection surface 43*a* of the reflection cover 43 and the upper surface of the tablet W, so that a part of the light that cannot reach the incidence end 41*a* of the optical fiber 41 in a case where the reflection cover 43 is not provided also reaches the incidence end 41*a*. As described above, the reflection cover 43 can increase an amount of transmission light incident on the incidence end 41*a* of the optical fiber 41.

In the present embodiment, the light detection unit 4 has a tubular member 45 between the tablet W and the optical fiber 41 at the predetermined inspection position. The tubular member 45 is attachably and detachably attached to the base member 40, protrudes from the base member 40 toward a tablet W side, and is open on the tablet W side. The tubular member 45 may be made of, for example, metal such as aluminum or a resin.

Specifically, the tubular member 45 is formed in a tubular shape having a predetermined length in a protruding direction (in the present embodiment, a vertical direction), and has an opening end 45*b* in which an opening 45*a* is formed at an end portion on the tablet W side (in the present embodiment, the lower side) in the protruding direction. In the present embodiment, a shape of the opening 45*a* is formed in a perfect circular shape.

An end portion of the tubular member 45 on a side opposite to the tablet W side (the upper side in the present embodiment) in the protruding direction is also open, but a diameter of the opening need not be the same as a diameter of the opening 45*a*. An opening having a size through which at least the optical fiber 41 passes need only be formed at the end portion of the tubular member 45 on the side opposite to the tablet W side in the protruding direction.

The tubular member 45 is disposed such that the incidence end 41*a* of the optical fiber 41 and the opening 45*a* overlap each other in an axial direction of the tubular member 45 (in the vertical direction in FIG. 1). In other words, this means that, when the light detection unit 4 is viewed from the tablet W side in the axial direction of the tubular member 45, the incidence end 41*a* of the optical fiber 41 is accommodated in an opening region of the opening 45*a*. It is preferable that the center of the incidence end 41*a* of the optical fiber 41 is positioned on an axis of the tubular member 45 passing through the center of the opening 45*a* in these dispositions. The transmission light transmitted through the tablet W passes through the tubular member 45 from the opening 45*a* and is incident on the optical fiber 41.

In addition, the opening 45*a* of the tubular member 45 is positioned on the tablet W side with respect to the incidence end 41*a* of the optical fiber 41. In other words, the incidence end 41*a* of the optical fiber 41 is spaced from the tablet W in the axial direction of the tubular member 45 with respect to the opening 45*a* of the tubular member 45. In the present embodiment, the incidence end 41*a* of the optical fiber 41 is disposed to be positioned inside the tubular member 45.

The incidence end 41*a* of the optical fiber 41 may be disposed, for example, to be positioned inside the base member 40. Further, the optical fiber 41 may be configured such that a position of the incidence end 41*a* in the axial direction of the tubular member 45 is adjustable.

An inner wall surface 45*c* of the tubular member 45 is subjected to a low-reflective surface treatment for absorbing light. For example, the inner wall surface 45*c* is made black coating to reduce the reflection of light.

In the present embodiment, the opening end 45*b* of the tubular member 45 is sharply formed. That is, the tubular member 45 has a narrowing shape at the opening end 45*b*, and an area of a facing surface facing the tablet W at the opening end 45*b* is reduced.

In addition, the tubular member 45 is formed in a tapered shape in which a diameter of an outer wall surface 45*d* thereof increases from the opening end 45*b* toward a base member 40 side. Accordingly, rigidity of the tubular member 45 in a case where the tubular member 45 is attached to the base member 40 is increased. The outer wall surface 45*d* of the tubular member 45 need not have a tapered shape. The outer wall surface 45*d* may be subjected to a low-reflective surface treatment for absorbing light.

The narrowing shape of the opening end 45*b* may be, for example, a shape that gradually narrows according to the tapered shape of the outer wall surface 45*d*, or a shape in which only the shape of the end portion of the tubular member 45 on an opening end 45*b* side narrows.

Inspection Unit

The inspection unit 2 has a signal processing unit 2*a* that performs signal processing on the spectral characteristic obtained by the light detection unit 4 within a predetermined exposure time, and inspects a quality of the tablet W, that is, performs good/bad determination of the quality of the tablet W from a result of the signal processing.

The signal processing unit 2*a* calculates a spectral characteristic in an absorbance of the tablet W from the spectral characteristic obtained by the light detection unit 4. Specifically, an absorbance A at a wavelength A is obtained by an equation $A=-\log 10(I/Ii)$ of a common logarithm of a ratio of light intensity Ii of incident light to light intensity I of the transmission light (transmittance), and a transmission amount detected in a state where the tablet W is not present at the predetermined inspection position can be obtained as the light intensity Ii of the incident light.

The inspection unit 2 compares a spectral characteristic (intensity of each wavelength of the spectrum (including a case of being differentiated multiple times), a shape of a waveform, information obtained by extracting the entire or a part of a region and providing a calibration curve thereof, and statistical information) in an absorbance of a good product of the tablet W acquired in advance with the spectral characteristic in the absorbance of the tablet W to be inspected, which is transported to the predetermined inspection position, and determines whether or not the quality of the tablet W is good based on the magnitude of a difference thereof. The inspection unit 2 outputs a selection signal based on a good/bad result of the determination to a selection unit (not shown) that selects the tablet W as a normal product or a defective product.

Specifically, whether or not the quality of the tablet W is good is determined, for example, based on whether or not a differential amount for each wavelength defined by calculation using a calibration curve obtained by a statistical calculation result (such as standard deviation), a statistical method such as regression, or the like is within a predetermined range (a range defined based on a statistical calculation result or a result of calibration curve). In addition, it is also possible to determine whether or not the quality of the tablet W is good based on whether or not total intensity of wavelengths is within a predetermined range. Further, in a case where the components of the tablet W are uniform, whether or not the quality of the tablet W is good may be determined based on whether or not there is intensity exceeding a predetermined threshold value set in advance in a region other than a specific wavelength.

Regarding Action of Tubular Member

Next, an action of the tubular member 45 of the present embodiment will be described with reference to FIGS. 2 and 3.

Figure 2:
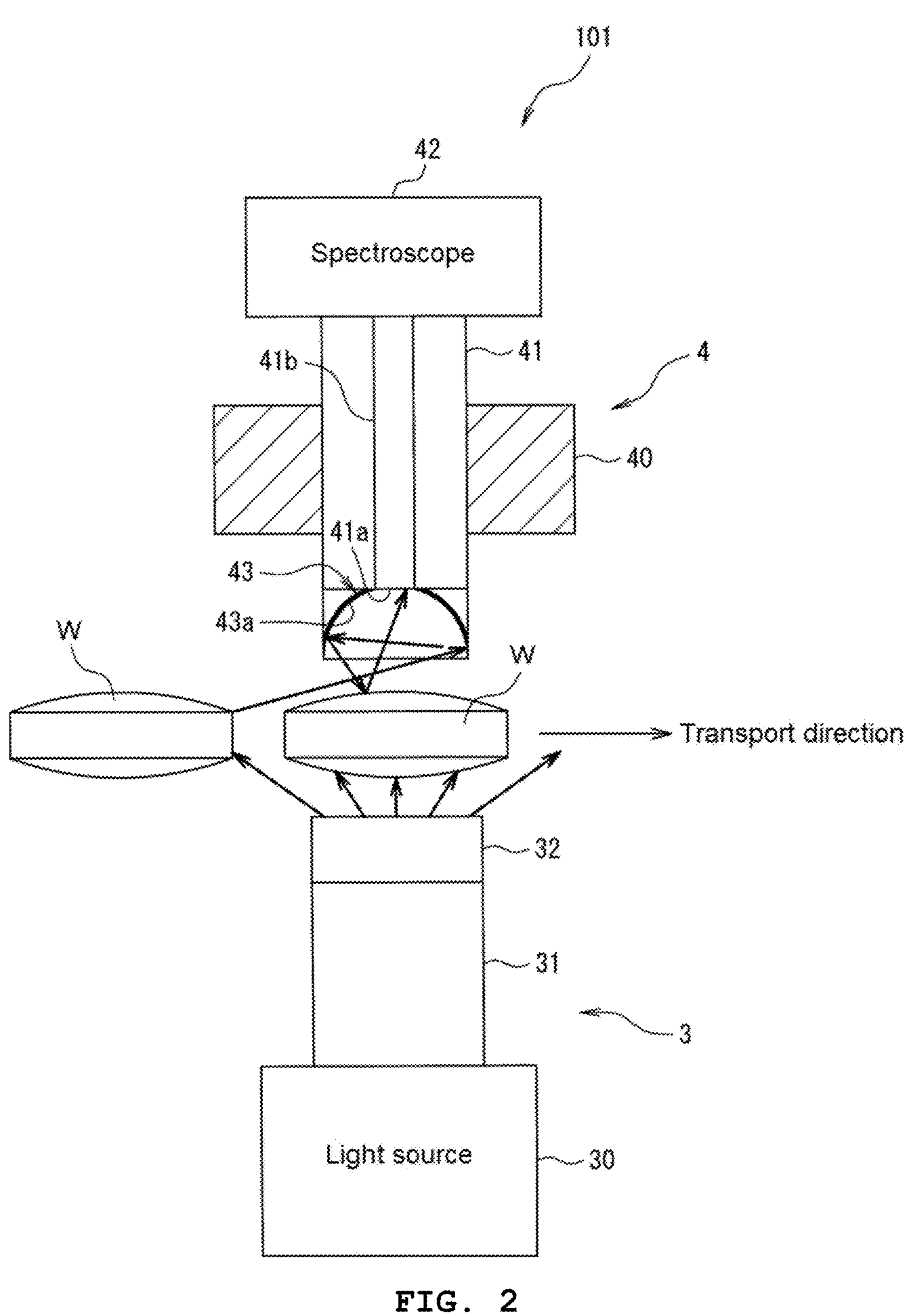
FIG. 2 is a schematic view showing a spectroscopic measurement device of a comparative example that does not include a tubular member of the spectroscopic measurement device according to the embodiment of the present invention.
Figure 3:
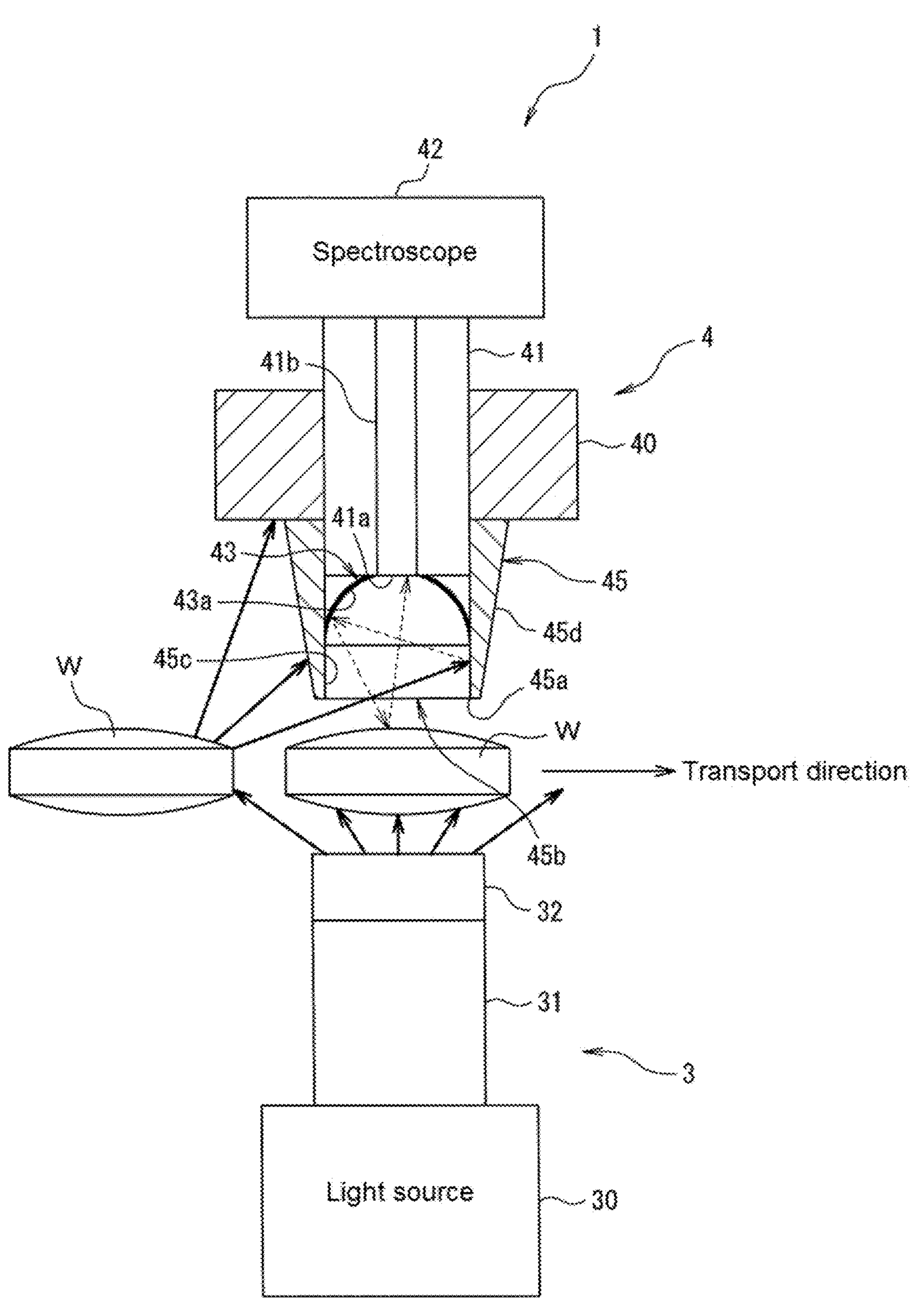
FIG. 3 is a schematic view for describing an action of the spectroscopic measurement device according to the embodiment of the present invention.

FIGS. 2 and 3 schematically show a state in which a plurality of tablets W are sequentially transported in a transport direction at predetermined intervals and are irradiated with light from the light source unit 3 at the predetermined inspection position. Solid-line arrows and broken-line arrows in FIGS. 2 and 3 schematically show an optical path of a part of the light emitted from the light source unit 3 or the reflected light.

FIG. 2 shows a spectroscopic measurement device 101 of a comparative example that does not including the tubular member 45. The spectroscopic measurement device 101 of the comparative example is different from the spectroscopic measurement device 1 of the present embodiment in that the tubular member 45 is not provided, but the other configurations are the same as those of the spectroscopic measurement device 1 of the present embodiment. FIG. 3 shows the spectroscopic measurement device 1 of the present embodiment.

As shown in FIG. 2, in the spectroscopic measurement device 101 of the comparative example, most of the light emitted from the light source unit 3 is incident on the tablet W, while the light is reflected from side surfaces or the like of the tablets W (a previously transported tablet and a tablet to be transported next) arranged at predetermined intervals with respect to the tablet W being measured and is incident on the reflection cover 43. The light incident on the reflection cover 43 is further reflected in the reflection cover 43 or reflected on the upper surface of the tablet W and is incident on the incidence end 41*a* of the optical fiber 41.

As described above, the light reflected by the tablets W transported before and after the tablet W being measured and incident on the incidence end 41*a* of the optical fiber 41 is incident on the optical fiber 41 as stray light. In this case, there is a concern that accuracy of data of the spectrum of the light received by the light detection unit 4 may be decreased.

On the other hand, as shown in FIG. 3, in the spectroscopic measurement device 1 of the present embodiment, most of the light emitted from the light source unit 3 is incident on the tablet W, while the light is reflected from the side surfaces or the like of the tablets W (the previously transported tablet and the tablet to be subsequently transported) arranged at the predetermined intervals with respect to the tablet W being measured, but the reflected light is blocked by the outer wall surface 45*d* of the tubular member 45, and the amount of the light incident on the reflection cover 43 is reduced.

In addition, a part of the light reflected from the side surfaces or the like of the tablets W arranged at predetermined intervals with respect to the tablet W being measured is also reflected from a lower surface of the base member 40. Here, in a case where the lower surface of the base member 40 is close to the opening end 45*b* of the tubular member 45, there is a possibility that the light reflected by the lower surface of the base member 40 is reflected again on at least any of the upper surfaces of the previously transported tablet W and the tablet W to be subsequently transported and is incident on the tubular member 45.

In the present embodiment, since the lower surface of the base member 40 is spaced further from the tablet W as compared with the opening end 45*b* of the tubular member 45, the optical path of the light reflected by the lower surface of the base member 40 is lengthened, and the light is attenuated before being incident on the tubular member 45 after being reflected again on at least any of the upper surfaces of the tablet W previously transported and the tablet W to be subsequently transported. Therefore, it is possible to reduce the possibility that the light reflected by the lower surface of the base member 40 is incident on the tubular member 45.

The light that may be incident on the incidence end 41*a* of the optical fiber 41 as stray light may include, in addition to the light emitted from the light source unit 3 and reflected by the tablets W adjacent in the transport direction, light other than the light emitted from the light source unit 3, for example, light caused by the tablets W adjacent in the transport direction reflecting external light in an installation location of the spectroscopic measurement device 1. In the present embodiment, entry of the light as above into the incidence end 41*a* of the optical fiber 41 also can be blocked by the tubular member 45.

In the present embodiment, even in a case where a part of the light reflected by the tablets W adjacent to the tablet W being measured in the transport direction is incident on the tubular member 45, the incident light is absorbed by the inner wall surface 45*c* of the tubular member 45 that is subjected to the low-reflective surface treatment, so that the light reflected thereafter can be attenuated as indicated by the broken-line arrows in FIG. 3.

Regarding Replacement of Tubular Member

In the spectroscopic measurement device 1 of the present embodiment, the tubular member 45 is configured to be replaceable according to a type of an article to be inspected (to be measured).

For example, in a case where the article to be examined (to be measured) is a tablet, the tubular member 45 having an optimum dimension can be selected and used according to a diameter of the tablet, a thickness of the tablet, and a shape of the tablet. It is preferable that various dimensions of the tubular member 45 are prepared so that the optimum combination of a diameter (inner tube diameter) of the opening 45*a*, which is, for example, small, medium, or large, and a length (tube length) in the axial direction, which is, for example, short, medium, or long, can be used according to a type of the tablet. The above-mentioned tube length is a length from an opening end of the reflection cover 43 (in the present embodiment, a lower end) to the opening end 45*b*. The types of dimensions are not limited to the three stages described above.

Here, some examples of the type of the tubular member 45 will be described.

For example, in a case where a flat square prism having a small diameter, a small thickness, and a flat square shape is to be measured, it is preferable to use the tubular member 45 having a small inner tube diameter and a long tube length. In this way, since a gap between the surface (the upper surface in the present embodiment) of the tablet on the light detection unit 4 side and the opening end 45*b* of the tubular member 45 is large in a case where the thickness of the tablet to be measured is small, it is preferable to use the tubular member 45 having a long tube length in order to reduce the gap.

For example, in a case where a flat square prism having a small diameter and a large thickness is to be measured, it is preferable to use the tubular member 45 having a small inner tube diameter and a short tube length. As described above, since an amount of the transmission light transmitted through the tablet is smaller in a case where the thickness of the tablet to be measured is large as compared with a case where the thickness of the tablet is small, it is preferable to use the short tubular member 45 so that a small amount of light is not significantly attenuated by the inner wall surface 45*c* of the tubular member 45.

For example, in a case where a round-shaped tablet having a moderate diameter, a small thickness, and an end surface with a curved surface shape is to be measured, it is preferable to use the tubular member 45 having a moderate inner tube diameter and a long tube length. In this way, in a case where the tablet to be measured has an end surface with a curved surface shape, variation in transmission light between tablets is likely to occur.

Figure 4:
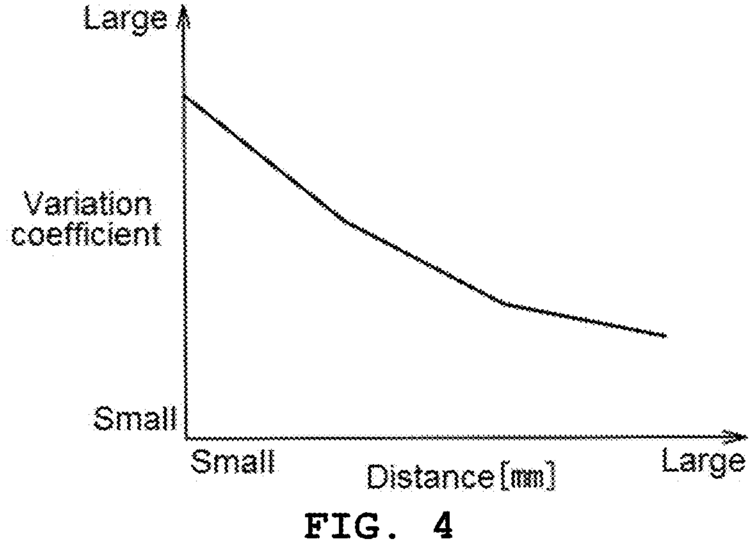
FIG. 4 is a graph for describing the action of the spectroscopic measurement device according to the embodiment of the present invention, and is a graph showing a relationship between a distance between an article and an incidence end of an optical fiber and a variation coefficient.

FIG. 4 is an example showing a relationship between a distance between the article to be measured and the incidence end 41*a* of the optical fiber 41 and a variation coefficient. As shown in FIG. 4, the variation coefficient tends to decrease as the distance between the article to be measured and the incidence end 41*a* of the optical fiber 41 increases.

Therefore, for example, in a case where the tablet to be measured has an end surface with a curved surface shape as described above, it is preferable to use the tubular member 45 having a long tube length in which the variation coefficient can be reduced.

Actions and Effects

As described above, in a spectroscopic measurement device according to the present embodiment, the light detection unit 4 includes the tubular member 45 between the tablet W and the optical fiber 41, the opening 45*a* at an end of the tubular member 45 on the tablet W side is positioned on the tablet W side with respect to the incidence end 41*a* of the optical fiber 41, and the transmission light passes through the tubular member 45 from the opening 45*a* and is incident on the optical fiber 41. Therefore, it is possible to block the incidence of the light other than the transmission light, which is emitted from the light source unit 3 and transmitted through the tablet W, on the incidence end 41*a* of the optical fiber 41 with the tubular member 45. Therefore, the spectroscopic measurement device according to the present embodiment can prevent entry of stray light into the optical fiber 41 and can prevent a decrease in the accuracy of the data of the spectrum of the light incident on the optical fiber 41.

In addition, in the spectroscopic measurement device according to the present embodiment, since the inner wall surface 45*c* of the tubular member 45 is subjected to the surface treatment for absorbing light, even in a case where stray light enters the tubular member 45 through the opening 45*a* of the tubular member 45 from the gap between the tablet W and the tubular member 45, the inner wall surface 45*c* can absorb or attenuate the stray light. As a result, the stray light incident on the incidence end 41*a* of the optical fiber 41 can be reduced.

In addition, in the spectroscopic measurement device according to the present embodiment, since the opening end 45*b* of the tubular member 45 is sharply formed, it is possible to reduce a case where stray light is reflected on the opening end 45*b* of the tubular member 45 facing the tablet W to the tablet W side and is further reflected on the tablet W side to the incidence end 41*a* side of the optical fiber 41.

In addition, in the spectroscopic measurement device according to the present embodiment, since the tubular member 45 is configured to be replaceable according to the type of the article to be measured, in a case where the article to be measured is changed to an article of a different type, the dimension of the opening 45*a* and the length of the opening 45*a* in the axial direction can be changed to the tubular member 45 that is optimally formed for the article, for example, according to the shape, the dimension, or the like of the article after the change. Accordingly, even in a case where the article to be measured is changed, the entry of stray light into the optical fiber 41 can be prevented.

In addition, since an article inspection device according to the present embodiment includes the spectroscopic measurement device 1 that can prevent entry of stray light into the optical fiber 41 and can prevent a decrease in the accuracy of the data of the spectrum of the light incident on the optical fiber 41, it is possible to prevent a decrease in the inspection accuracy of the quality of the tablet W using the inspection unit 2.

MODIFICATION EXAMPLE

In the present embodiment, a configuration in which the opening 45*a* of the tubular member 45 is formed in a perfect circular shape has been described, but the present invention is not limited thereto. The shape of the opening 45*a* may be a shape that is laterally long in a direction perpendicular to the transport direction of the tablet W and has a dimension smaller than the diameter of the tablet W in the transport direction of the tablet W, for example, an elliptical shape or a rectangular shape.

Figures 5, 6:
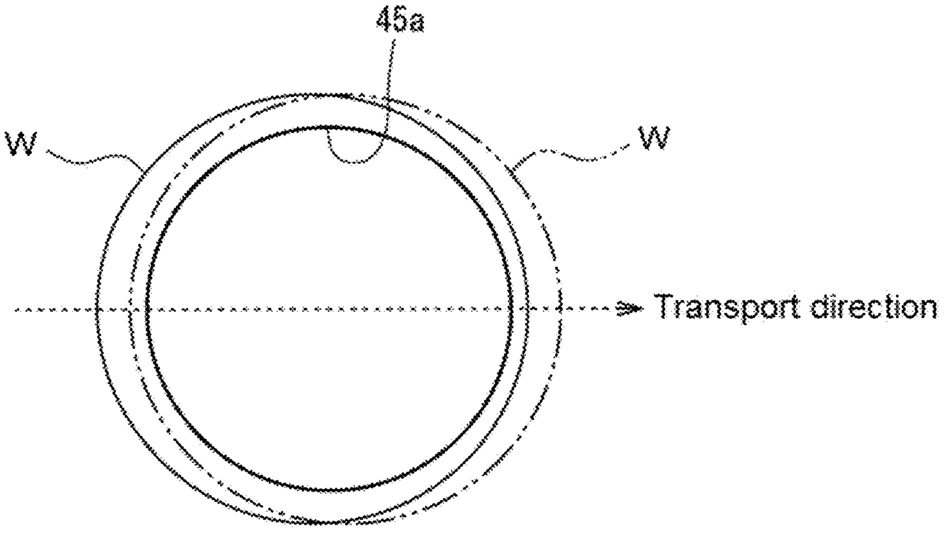
FIG. 5 is a view showing an example in which a cross section of the tubular member perpendicular to an axial direction is a perfect circular shape in the spectroscopic measurement device according to the embodiment of the present invention.
FIG. 6 is a view showing an example in which the cross section of the tubular member perpendicular to the axial direction is an elliptical shape in the spectroscopic measurement device according to the embodiment of the present invention.

With reference to FIGS. 5 and 6, an effect of setting the shape of the opening 45*a* of the tubular member 45 to an elliptical shape, a rectangular shape, or the like will be described using an elliptical shape having a minor axis shorter than the diameter of the tablet W in the transport direction (moving direction) of the tablet W as an example. In FIGS. 5 and 6, the tablet W that is moving in the transport direction is shown by a solid line and a two-dot chain line.

As shown in FIG. 5, in a case where the shape of the opening 45*a* of the tubular member 45 is a perfect circular shape, the time during which the tablet W that is moving in the transport direction overlaps the entire region of the opening 45*a* of the tubular member 45 is short. Therefore, in a case where the shape of the opening 45*a* of the tubular member 45 is a perfect circular shape, a light-receiving area is smaller as compared with a case where the shape of the opening 45*a* of the tubular member 45 is an elliptical shape, which will be described later.

On the other hand, as shown in FIG. 6, in a case where the shape of the opening 45*a* of the tubular member 45 is an elliptical shape, the time during which the tablet W that is moving in the transport direction overlaps the entire region of the opening 45*a* of the tubular member 45 is long. Therefore, in a case where the shape of the opening 45*a* of the tubular member 45 is an elliptical shape, the light-receiving area is larger as compared with the case where the shape of the opening 45*a* of the tubular member 45 is a perfect circular shape. As a result, an amount of transmission light obtained by the light detection unit 4 increases.

In this way, in a case where the shape of the opening 45*a* of the tubular member 45 is an elliptical shape, the tablet W that is moving can be irradiated with light for a longer time, and the accuracy of the data of the spectrum of the light incident on the optical fiber 41 can be improved.

In a case where the tablet W has a laterally long shape, the dimension of the opening 45*a* of the tubular member 45 is different between a case where the tablet W is transported such that the major axis of the tablet W is parallel to the transport direction and a case where the tablet W is transported such that the minor axis of the tablet W is parallel to the transport direction. For example, in a case where the tablet W is transported such that the major axis of the tablet W is parallel to the transport direction, the dimension of the opening 45*a* in the transport direction need only be shorter than the major axis of the tablet W. On the other hand, in a case where the tablet W is transported such that the minor axis of the tablet W is parallel to the transport direction, the dimension of the opening 45*a* in the transport direction is set to be shorter than the minor axis of the tablet W.

In addition, in the present embodiment, the example in which the tubular member 45 is made replaceable to address the change of the article to be measured has been described, but the change of the article to be measured may be addressed by making the position of the incidence end 41*a* of the optical fiber 41 in the axial direction of the tubular member 45 adjustable.

Although the embodiment of the present invention has been disclosed, it is apparent that modifications may be made by those skilled in the art without departing from the scope of the present invention. All such modifications and equivalents are intended to be included in the following claims.

DESCRIPTION OF REFERENCE NUMERALS AND SIGNS

1: spectroscopic measurement device
2: inspection unit
2*a*: signal processing unit
3: light source unit
4: light detection unit
10: article inspection device
11: transport disk
30: light source
31: light guide
32: optical lens
40: base member
41: optical fiber
41*a*: incidence end
42: spectroscope
43: reflection cover
43*a*: reflection surface
45: tubular member
45*a*: opening
45*b*: opening end
45*c*: inner wall surface
45*d*: outer wall surface
W: tablet (article)

What is claimed is:

1. A spectroscopic measurement device comprising:

a light source unit configured to irradiate an article with light; and a light detection unit including an optical fiber on which transmission light transmitted through the article is incident and a spectroscope configured to measure a spectral characteristic of the transmission light passing through the optical fiber, wherein the light detection unit further includes a tubular member on an optical path between the article and the optical fiber, and an opening on an end of the tubular member on a side facing toward the article is positioned on the article side with respect to an incidence end of the optical fiber and the transmission light passes through the tubular member from the opening and is incident on the optical fiber.

2. The spectroscopic measurement device according to claim 1, wherein a surface treatment for absorbing light is performed on an inner wall surface of the tubular member.

3. The spectroscopic measurement device according to claim 1, wherein the tubular member includes an opening end at which the opening is formed, and the opening end is sharply formed.

4. The spectroscopic measurement device according to claim 2, wherein the tubular member includes an opening end at which the opening is formed, and the opening end is sharply formed.

5. The spectroscopic measurement device according to claim 1, wherein the light source unit is configured to irradiate the article that is moving with light, and the tubular member has an elliptical shape in which a shape of the opening has a minor axis with a dimension shorter than a diameter of the article in a moving direction of the article.

6. The spectroscopic measurement device according to claim 2, wherein the light source unit is configured to irradiate the article that is moving with light, and the tubular member has an elliptical shape in which a shape of the opening has a minor axis with a dimension shorter than a diameter of the article in a moving direction of the article.

7. The spectroscopic measurement device according to claim 3, wherein the light source unit is configured to irradiate the article that is moving with light, and the tubular member has an elliptical shape in which a shape of the opening has a minor axis with a dimension shorter than a diameter of the article in a moving direction of the article.

8. The spectroscopic measurement device according to claim 4, wherein the light source unit is configured to irradiate the article that is moving with light, and the tubular member has an elliptical shape in which a shape of the opening has a minor axis with a dimension shorter than a diameter of the article in a moving direction of the article.

9. The spectroscopic measurement device according to claim 1, wherein the tubular member is configured to be replaceable according to a type of the article.

10. The spectroscopic measurement device according to claim 2, wherein the tubular member is configured to be replaceable according to a type of the article.

11. The spectroscopic measurement device according to claim 3, wherein the tubular member is configured to be replaceable according to a type of the article.

12. The spectroscopic measurement device according to claim 5, wherein the tubular member is configured to be replaceable according to a type of the article.

13. An article inspection device comprising:

the spectroscopic measurement device according to claim 1; and an inspection unit configured to inspect a quality of the article based on the spectral characteristic measured by the spectroscope.

14. An article inspection device comprising:

the spectroscopic measurement device according to claim 2; and an inspection unit configured to inspect a quality of the article based on the spectral characteristic measured by the spectroscope.

15. An article inspection device comprising:

the spectroscopic measurement device according to claim 3; and an inspection unit configured to inspect a quality of the article based on the spectral characteristic measured by the spectroscope.

16. An article inspection device comprising:

the spectroscopic measurement device according to claim 5; and an inspection unit configured to inspect a quality of the article based on the spectral characteristic measured by the spectroscope.

17. An article inspection device comprising:

the spectroscopic measurement device according to claim 6; and an inspection unit configured to inspect a quality of the article based on the spectral characteristic measured by the spectroscope.

18. An article inspection device comprising:

the spectroscopic measurement device according to claim 9; and an inspection unit configured to inspect a quality of the article based on the spectral characteristic measured by the spectroscope.

19. The article inspection device according to claim 16, further comprising:

a transport unit configured to hold the article on an end surface different from an irradiation-side surface and a transmission-side surface of the article and move the article in a state in which the irradiation-side surface and the transmission-side surface are exposed.

20. The article inspection device according to claim 17, further comprising:

a transport unit configured to hold the article on an end surface different from an irradiation-side surface and a transmission-side surface of the article and move the article in a state in which the irradiation-side surface and the transmission-side surface are exposed.

* * * * *